United States Patent
Krol

(10) Patent No.: US 10,295,347 B2
(45) Date of Patent: May 21, 2019

(54) STACK OF MAPS

(71) Applicant: Urban Engines, Inc., Los Altos, CA (US)

(72) Inventor: Agata Krol, Los Altos, CA (US)

(73) Assignee: URBAN ENGINES, INC., Los Altos, CA (US)

(*) Notice: Subject to any disclaimer, the term of this patent is extended or adjusted under 35 U.S.C. 154(b) by 512 days.

(21) Appl. No.: 14/845,849

(22) Filed: Sep. 4, 2015

(65) Prior Publication Data

US 2016/0070448 A1 Mar. 10, 2016

Related U.S. Application Data

(60) Provisional application No. 62/046,083, filed on Sep. 4, 2014.

(51) Int. Cl.
*G01C 21/00* (2006.01)
*G06F 16/29* (2019.01)

(52) U.S. Cl.
CPC ............. *G01C 21/00* (2013.01); *G06F 16/29* (2019.01)

(58) Field of Classification Search
CPC . G06F 17/30241; G09B 29/00; G09B 29/007; G01C 21/00; G01C 21/3694; G01C 21/3667; G01C 21/34
See application file for complete search history.

(56) References Cited

U.S. PATENT DOCUMENTS

| | | | |
|---|---|---|---|
| 6,504,541 B1 | 6/2003 | Liu et al. | |
| 7,957,749 B1 * | 6/2011 | Roberts | G09B 29/10 342/350 |
| 8,484,187 B1 | 7/2013 | Hong et al. | |
| 2009/0100342 A1 | 4/2009 | Jakobson | |
| 2010/0161215 A1 | 6/2010 | Karani | |
| 2010/0241944 A1 | 9/2010 | Athsani et al. | |
| 2012/0304087 A1 | 11/2012 | Walkin et al. | |

(Continued)

FOREIGN PATENT DOCUMENTS

EP 2 672 226 A2 12/2013

OTHER PUBLICATIONS

PCT International Search Report and Written Opinion, PCT Application No. PCT/US2015/048679, dated Nov. 27, 2015, ten pages.

(Continued)

*Primary Examiner* — Jeffrey A Gaffin
*Assistant Examiner* — Bille M Dahir
(74) *Attorney, Agent, or Firm* — Marshall, Gerstein & Borun LLP

(57) ABSTRACT

A system collects user data that describes at least one destination. The system generates, based on the collected user data, map data to render a plurality of maps. The maps are arranged in a stack so that a first interactive map is primarily displayed in the user interface and one or more dynamic maps are conceptually below that interactive map. A portion of each dynamic map is viewable and selectable within the user interface. As updated map data is received, information on the interactive map and dynamic maps is correspondingly updated. When a dynamic map is selected or the system detects that a dynamic map is to be displayed, the system provides for display a new interactive map that replaces the previous interactive map in the user interface.

26 Claims, 11 Drawing Sheets

(56) References Cited

U.S. PATENT DOCUMENTS

2014/0245232 A1    8/2014  Bailiang
2015/0247736 A1*  9/2015  Moore ................. G01C 21/367
                                                                                               701/519

OTHER PUBLICATIONS

Dolcourt, "How to Find Your Car with Google Now," (2014). Retrieved from the Internet at: URL:https://web.archive.org/web/20140515065720/http://cnet.com:80/how-to/how-to-find-your-car-with-google-now-parking-locator-card.
Extended European Search Report for Application No. 15838700.1, dated Mar. 23, 2018.

* cited by examiner

STACK OF MAPS

CROSS-REFERENCE TO RELATED APPLICATIONS

This application claims the benefit of U.S. Provisional Application No. 62/046,083, filed on Sep. 4, 2014, which is hereby incorporated by reference in its entirety.

BACKGROUND

1. Field of Art

The disclosure generally relates to the field of electronic maps, and specifically to visual display (or rendering).

2. Description of the Related Art

As the technologies of Geographic Information Systems (GIS) develop rapidly, electronic maps have been more and more widely used in various applications. Users use electronic maps to guide their trips. In addition, the electronic maps have become interactive, such as allowing users to zoom in or zoom out, sometimes by replacing one map with another of different scale, centered where possible on the same point. Furthermore, some electronic maps have route-planning functions and advice facilities by monitoring the user's position with the help of satellites.

However, current solutions for electronic maps only provide for display of one map at a time. This is inconvenient when users seek visual insight at one time on multiple maps corresponding to multiple locations. Accordingly, there is lacking a suite of methods for rendering multiple maps simultaneously in order to give users rich visual insight about multiple locations while allowing the users to conveniently interact with a real-time map.

SUMMARY

Embodiments of the present disclosure are generally directed to display of (or rendering of) a stack of maps. In some embodiments, a method, device, or system is disclosed for rendering a stack of maps. The disclosed configuration comprises collecting user data for rendering a plurality of maps to a user. The user data describes at least one destination. In one embodiment, the destination described by the user data is the user's favorite location. In some alternative embodiments, the user data includes recommended sets or popular sets of destinations that are either pre-loaded or that the user has affirmatively selected, e.g., top tourist spots, most popular restaurants.

The disclosed configuration generates, based on the user data, map data for rendering a stack of multiple maps. The stack of multiple maps includes a first interactive dynamic map (or interactive map) and a set of collapsed dynamic maps. The collapsed dynamic maps may update distance to destination, time remaining before next train arrival, etc. as the user is moving. The first interactive map is displayed in a relative position to the set of collapsed (or layered) dynamic maps. The disclosed configuration updates the map data to replace one of the collapsed dynamic maps with a second interactive map corresponding to the collapsed dynamic map and sends the map data for rendering the stack of multiple maps. The second interactive map is displayed to replace the relative position of the first interactive map.

DETAILED DESCRIPTION

Figure 1:
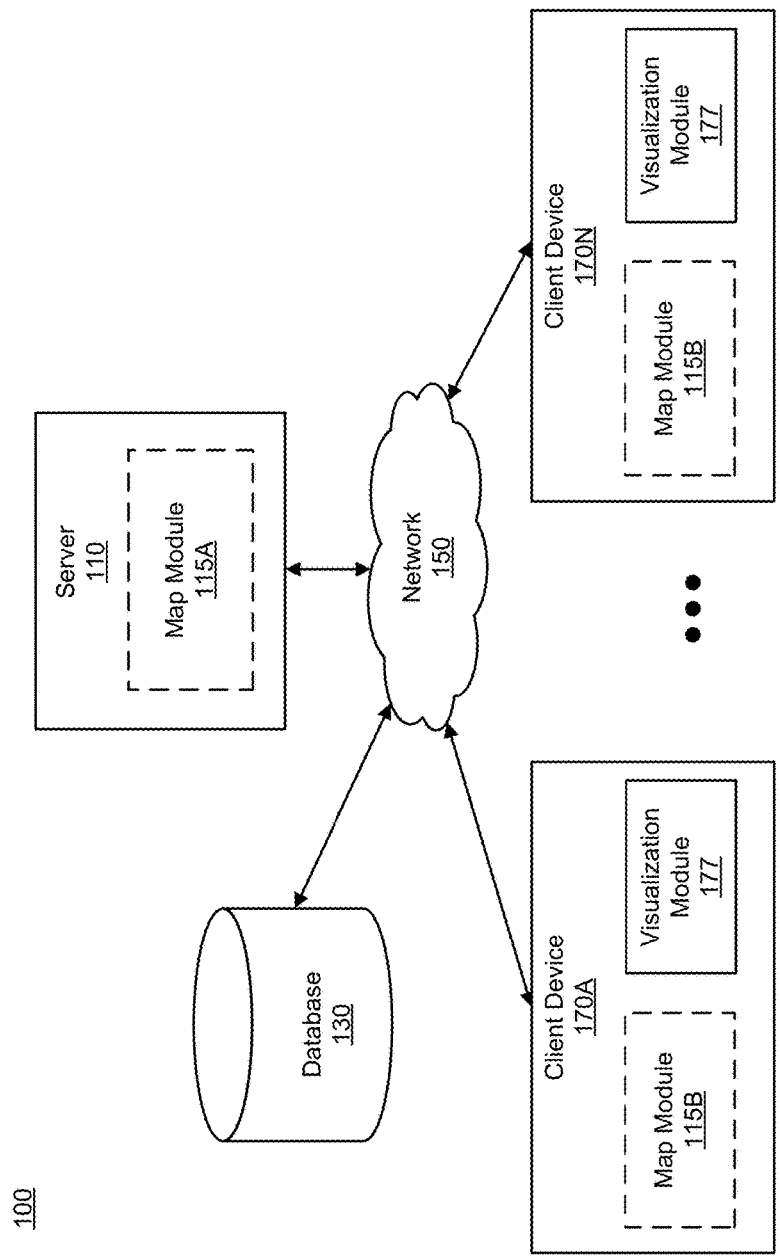
FIG. 1 is a high-level block diagram of an example computing environment for rendering a stack of maps according to one embodiment.

The disclosed embodiments have advantages and features, which will be more readily apparent from the detailed description, and the accompanying figures (or drawings).

The FIGS. 1-11 and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

The disclosed configurations provide improvements to conventionally rendered electronic maps. For example, a system (and computer-implemented method and non-transitory storage medium) is configured to provide (e.g., display or render) a stack of multiple maps that a user can interact with. In one example configuration, the system collects user data of a user describing locations such as a destination input by the user, one or more pre-identified (e.g., favorite) locations selected by the user, and/or a current location of the user. In addition, the system uses the user data to determine map data for rendering a stack of maps.

In one embodiment, electronic maps to be rendered on a user interface of a computing device are stacked together. For example, the stacked electronic maps are an electronic representation of two or more physical maps that are stacked (or collapsed or layered) on top of each other. Thus, the stack of maps corresponds to separate maps that can be rendered but are shown as if each of the maps is on top of another.

In addition, each of the separate electronic maps is rendered with a portion that is selectable, e.g., by a user, so that in response to selection of a particular map in that selectable area that map can go to the top for viewing. For example, the stack of maps includes an electronic dynamic interactive map (or interactive map) that identifies a current location of the device (e.g., used by the user) and is rendered on a user interface of a device to be on top of the stack of maps. Below the interactive map in the stack of maps is one or more dynamic maps that may be rendered in the user interface of the device as further described herein.

Each dynamic map corresponds with one or more predefined locations. The location may be predefined by a user selection on the device or that is sent to the device. The system sends the map data to the client device for displaying the stack of maps to the user. Further, the system may update the map data to replace one of the dynamic maps with another interactive map corresponding to the dynamic map. For example, the dynamic map can fade away and a new interactive map corresponding to the dynamic map (e.g., they both describe the same location) can take the spot of the previous interactive map.

The disclosed configurations provide numerous advantages over the conventional models. One example advantage of the system is to provide a user a quick shortcut to locations predefined by a user (e.g., favorite locations or regularly visited locations). For example, rather than spending substantial time on searching to find a route to each of a few locations, the system can record the locations selected by the user (e.g., regularly visited locations or locations selectable from an address on a web site or address book) and suggest the best possible routes to all of the selected locations upon a single tap of the user. Additionally, in another example, the system advantageously provides the user information to determine the best place to stay based on points of interest (POI), or helps the user navigate to multiple points of interest within a new city.

Yet another example advantage of the disclosed embodiments is that the system renders the maps in a "stack-like" manner. For example, the map that is visually displayed in the user interface on top most displays live data that can be interacted with by the user is an interactive map. The maps that are below (or under) the interactive map can be selected through a portion of such map that is visually displayable in the user interface. When selected, that map is "raised" to the top and becomes an interactive map that is relevant in terms of current location information. The prior interactive map can be entirely removed from the user interface or dropped under the current interactive map within the stack of maps.

As noted, the stack of maps includes one or more dynamic maps below the interactive map. These dynamic maps below the interactive map are collapsed below the interactive map. Collapsed below includes layered below or folded below. These maps, although not entirely visible in the user interface, are dynamic as the information within each of them is dynamically updated. For example, direction information about multiple locations and corresponding related information about those locations (e.g., a business hours of operations, reviews of business at that location), relative distances between locations, and any other type of information can be updated. An advantage of updating the information in the dynamic maps, despite not being immediately visible in the user interface, is that such information is immediately provided for display in the user interface when the stacked dynamic map becomes the current (or new) interactive map.

Hence, the system is faster and more efficient in providing information within a map compared to conventional configurations.

Example Computing Environment

FIG. 1 illustrates an exemplary computing environment 100 for rendering a stack of maps according to one embodiment. The computing environment 100 includes one or more servers (generally, server) 110, one or more client devices (generally, client device) 170A-N and one or more databases (generally, database) 130 connected by a network 150. Only one server 110, two client devices 170 and a database 130 are shown in FIG. 1 in order to simplify and clarify the description. Alternate or additional embodiments of the computing environment 100 can have multiple servers 110 and databases 130, and more than two client devices 170 connected to the network 150. Likewise, the functions performed by the various entities of FIG. 1 may differ in different embodiments. An example computing configuration of the server devices (or server) 110, client devices (or clients) 170 and database systems (or database) 130 is described in FIG. 2.

The server 110 is configured to collect user data (or information) to provide for rendering (or providing for display) multiple maps within a user interface of a client device 170. For example, the user data can describe a destination input (or selected) by the user to the client device 170. In addition, the user data can also identify a current location of the user. Alternatively, the user data may include recommended sets or popular sets of destinations that are either pre-loaded or that the user has affirmatively selected, e.g., top tourist spots, most popular restaurants, point of interest, etc. Furthermore, the user data can describe one or more locations favored by the user. For example, the user can use the client device 170 to select one or more locations that the user regularly visits (e.g., a supermarket, an entertainment place, an attraction, a school, a working place, etc.) as a pre-defined (e.g., favored) location. For each location, the server 110 generates map data to provide for rendering a stack of maps, each corresponding to a particular location.

After generating each map, the server 110 organizes the stack of multiple maps. This organization includes an interactive map and a set of collapsed dynamic maps. An interactive map is a map that allows the user to interact within that map (e.g., pan, zoom, etc.). The interactive map is the map immediately visible within the user interface on the client 170. The interactive map also is dynamic so locational information captured through the device can subsequently be illustrated within the user interface of the device. The interactive map also can illustrate a route from a start (or origin) location to an end (or destination) set by the user.

Each dynamic map below the interactive map can be a screen shot (or image) of a map corresponding to a particular location. The screen shot corresponds to a particular location and surrounding area. The amount of area displayed within the screen shot can be predefined by the user, e.g., an radius corresponding to a predefined distance from the location that is the center point of the map. Although a dynamic map is not "interactable" due to the map itself not being fully viewable within the user interface on the client device, information within it is updated as the device updates location related information (e.g., current global positioning system (GPS) coordinates, cell phone tower location, magnetometer/compass, or WiFi information). In addition, a portion of the collapsed dynamic map is selectable so that in response to selection of the selectable area, that map becomes the new interactive map and the prior interactive map is moved in the user interface to be either discarded or returned to the collapsed stack of maps.

Additionally, the server 110 sends (or transmits) the map data to provide for rendering the stack of multiple maps on the client device 170. For example, the interactive map can be displayed on top of the set of collapsed dynamic maps in a user interface such as one of the example user interfaces of maps shown in any of FIGS. 8-11. Further, the server 110 may update the map data to replace one of the collapsed dynamic maps with an interactive map corresponding to the collapsed dynamic map. For example, a screen shot map about a location can be replaced by rendering an interactive map corresponding to the same location so that the user can now interact with the map. In addition, the server 110 can send the updated map data to the client device 170 for displaying the new interactive map to replace the position of the previous interactive map.

In one embodiment, the server 110 includes a map module 115A (collectively and individually also referred to generally as 115) to mainly perform the functions of the server 110 described above. The map module 115 and the functions will be described in further detail below with reference to FIG. 3. Other embodiments of the server 110 may include different and/or additional components. In addition, the functions may be distributed among the server 110, database 130, and client device 170 in a different manner than described herein. For example, the map module 115 may be completely or partly stored on one or more of the client devices 170, illustrated as a map module 115B in FIG. 1.

A client device 170 is an electronic device used by a user to perform functions such as interacting with navigation maps, consuming digital content, executing software applications, browsing websites hosted by web servers on the network 150, downloading files, and interacting with the server 110. For example, the client device 170 may be a dedicated e-Reader, a smartphone, a wearable device (e.g., a smartwatch or pendant), or a tablet, a laptop, a notebook, or desktop computer configured similar to a computing system described with FIG. 2.

The client device 170 also includes interfaces with a display device on which the user may view the visualizations such as graphical user interfaces (GUIs) showing maps. In addition, the client device 170 provides a visual user interface (UI) that is rendered on a screen (or display). The screen may be touch sensitive and responsive to gestures. If the screen is not touch sensitive, the user interface also may include on-screen buttons. The user can interact directly with the rendered user interface (e.g., using gestures) and/or the rendered buttons. The rendered user interface provides an interface for the user to interact with the client device 170 and to perform functions. Examples of functions include selecting between maps, manipulating elements on the maps, inputting a destination, selecting a destination, zooming in or out of the maps, and any other possible interactions.

In one embodiment, the client device 170 includes the map module 115B and the visualization module 177, but other embodiments of the client device 170 include different and/or additional components. In addition, the functions may be distributed among the components in a different manner than described herein.

The visualization module 177 renders visualizations based on the map data generated by the map module 115, either residing on the server 110, or stored completely or partly on the client device 170. For example, the visualization module 177 renders a GUI displaying a stack of multiple maps that includes an interactive map and a set of collapsed dynamic maps, etc., based on the generated and/or updated map data by the map module 115.

The database 130 stores any data that is necessary for the server 110 and/or the client devices 170 to implement the functionalities described herein. For example, the database 130 stores the user data describing users' favorite locations. The database 130 may also store the map data describing the stack of interactive map and dynamic maps.

The network 150, which can be wired, wireless, or a combination thereof, enables communications among the server 110, client devices 170, and the database 130 and may include the Internet, a LAN, VLAN (e.g., with VPN), WAN, or other network. In one embodiment, the network 150 uses standard communications technologies and/or protocols. In another embodiment, the entities can use custom and/or dedicated data communications technologies instead of, or in addition to, the ones described above.

Computing Machine Architecture

Figure 2:
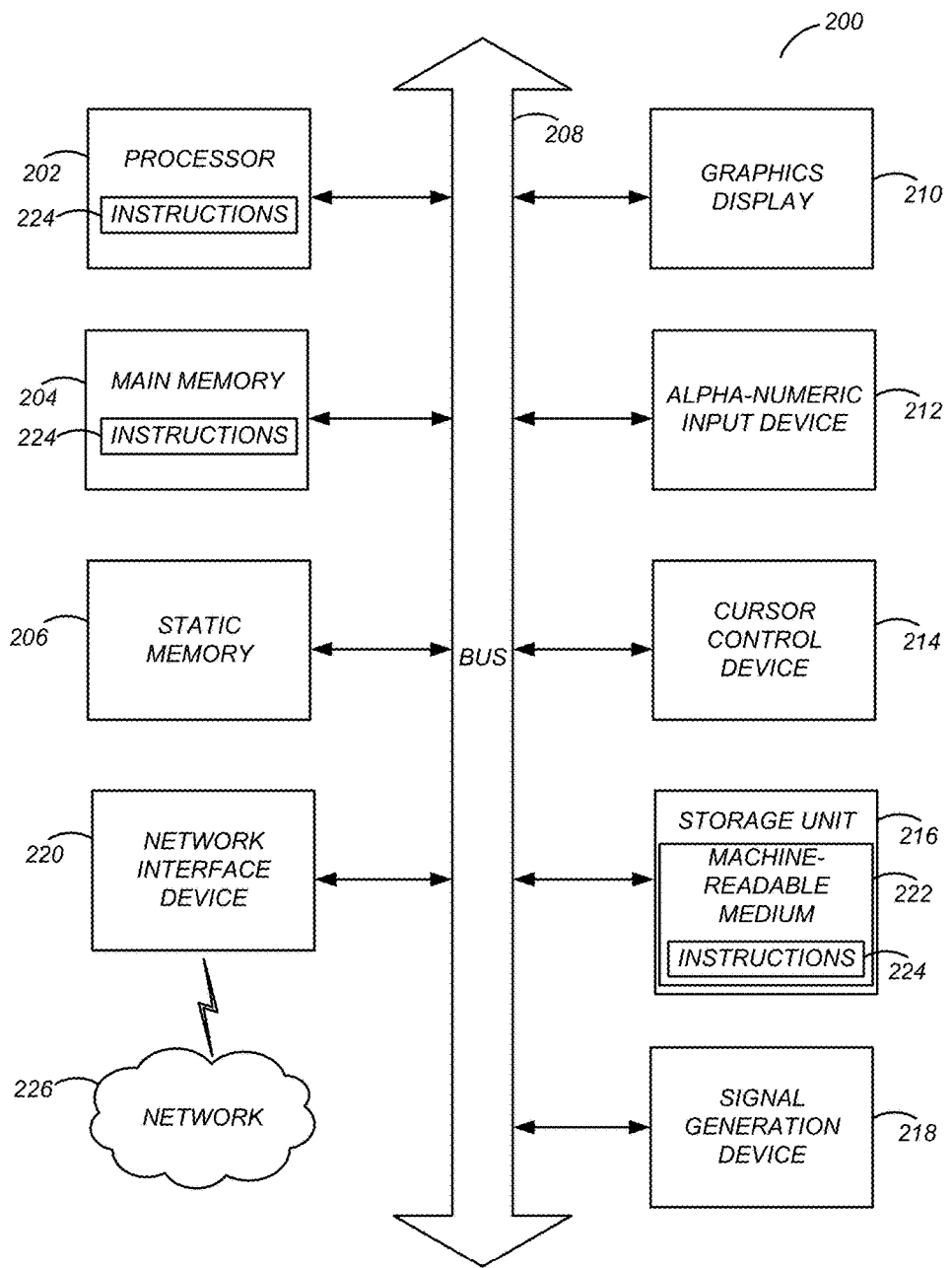
FIG. 2 is a block diagram illustrating components of an example machine able to read instructions from a machine-readable medium and execute them in a processor (or controller) for acting as a client device and/or server according to one embodiment.

FIG. 2 is a block diagram illustrating components of an exemplary machine able to read instructions (e.g., software or program code) from a machine-readable medium and execute them in a processor (or controller). The example machine shows one or more components that may be structured, and operational, within a client device 170 and/or a server device 110 as well as a standalone database 130. Specifically, FIG. 2 shows a diagrammatic representation of a machine in the example form of a computer system 200 within which instructions 224 (e.g., software or program code) for causing the machine to perform any one or more of the methodologies discussed herein may be executed. The methodologies can include the modules described with FIG. 1 and subsequently herein. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes one or more processors (generally processor 202) (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a dynamic memory 206, which are configured to communicate with each other via a bus 208. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208. In addition, the computer system 200 may include one or more positional sensors, e.g., an accelerometer or a global position system (GPS) sensor, connected with the bus 208. In addition, the network interface device 220 may include a WiFi or "cellular" mobile connection that also can be used to help identify locational information.

The storage unit 216 includes a machine-readable medium 222 on which are stored instructions 224 embodying any one or more of the methodologies or functions described herein. The instructions 224 may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 226 via the network interface device 220. It is noted that the database 130 can be stored in the storage 216 although it also can be stored in part or whole in the memory 204.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Example Map Module

Figure 3:
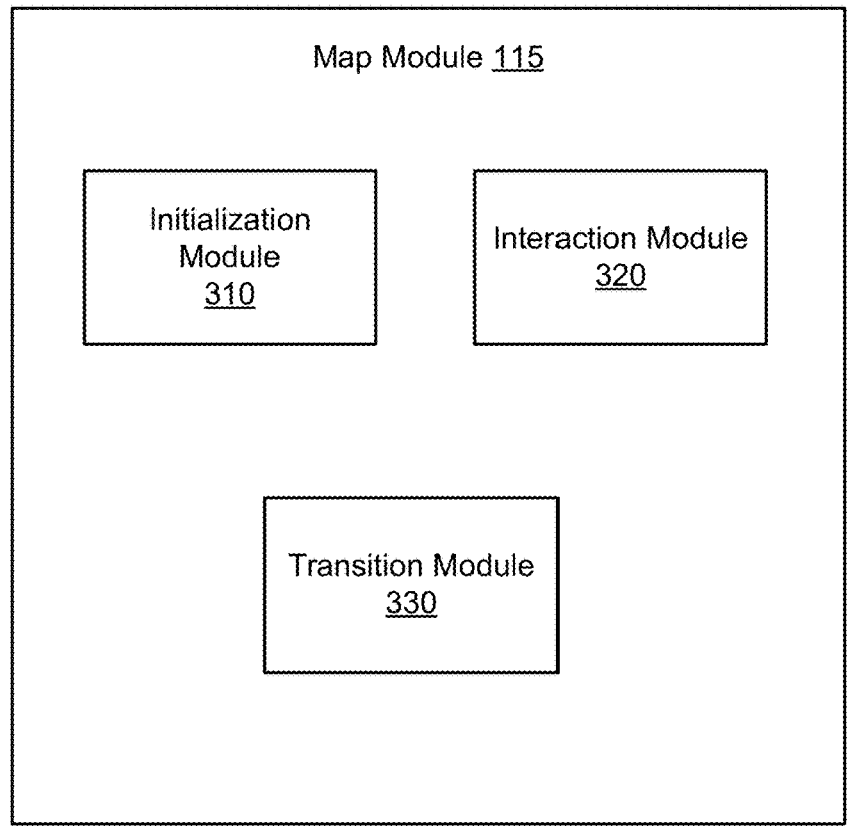
FIG. 3 is a block diagram illustrating a map module according to one embodiment.

Referring now to FIG. 3, a block diagram shows a map module 115 according to one example embodiment. In the example embodiment shown, the map module 115 has an initialization module 310, an interaction module 320 and a transition module 330. Those of skill in the art will recognize that other embodiments of the map module 115 can have different and/or additional modules other than the ones described here, and that the functions may be distributed among the modules in a different manner. In addition, it is noted that the modules may be configured as computer program code (or software) comprised of instructions, e.g., instructions 224, storable in a storage unit, e.g., 216, 222, 224, and executable by one or more processors, e.g., processor 202.

The initialization module 310 collects user data of a user (e.g., via a user account, direct input from a user, metadata associated with usage of the device, etc.) for rendering one or more maps based on the user data. In one embodiment, the initialization module 310 collects user data of a user from components (e.g., applications) of the client device 170, the database 130, the server 110 or other servers (not shown) such as a third-party server storing user data related to the user. The user data may describe a desired location the user intends to go to. For example, the user data can describe a destination that is input to the client device 170 by the user of the client device 170. The user data may additionally describe one or more locations, for example, that the user previously reviewed or visited. For example, the user data describes a location (e.g., home, a supermarket, an entertainment place, an attraction, a school, a working place, etc.) that the user has selected as a favorite location. Further, the user data may describe a context of the user. For example, the user data may describe a current location of the user detected by Global Positioning System (GPS) equipment, or other type of sensor included in the client device 170. Alternatively, the user data may include recommended sets or popular sets of destinations that are either pre-loaded or that the user has affirmatively selected, e.g., top tourist spots, most popular restaurants. Furthermore, the user data can describe one or more locations favored by the user. In addition, the initialization module 310 also collects other types of data that can be helpful for rendering maps for the user. For example, the initialization module 310 collects road information, traffic condition information, routing information, etc. for rendering maps for the user along with the user data.

In one embodiment, the initialization module 310 uses the user data and the other type of data to generate map data corresponding to program code for rendering one or more maps on the user device. For example, based on selection of a predefined, e.g., "favorite," location, the initialization module 310 can generate map data to render a map for the stack of maps that correspond with the location that the user selected as favorite. In one example embodiment, the map data for a map includes program code to provide for a rendering of a map on a user interface on the user device. In addition, there can be program code to render a zoom level for the map and/or code to render center coordinates of the map relative to a defined area within the map. The map data for a map may additionally include other information necessary for rendering the map on the client device 170. For example, the map data for a map describing a favorite location of the user may include an estimated time and distance from the favorite location to the current location of the user.

In one embodiment, the initialization module 310 determines map data to provide for rendering a map, for example, that corresponds with a screen captured map. For example, the map may be composed of a "screen shot" (e.g., program code for a user device to display the map) of a location that was just entered, selected or pre-defined. In one embodiment, the screen shot map related to a location may be static in terms of visual appearance, but also is dynamic relative to data displayed within it. As data, e.g., updated GPS coordinates, is captured by a client device, e.g., 170, the screen shot map may be updated accordingly. For example, a wider range of the map may be displayed or there may be a zoom around the area of interest. This will render an updated screen shot. Whether the screen shot map is re-rendered with a new screen shot map or not, the data within it may be updated, e.g., distance to a location of interest in the map relative to current location coordinate of the client device, e.g., 170. Hence, even though the map is not immediately visible on the user interface of the client device, the instructions corresponding to rendering of the map and/or data within it can be updated. Accordingly, these maps below the interactive map also can be referred as to as "dynamic" maps. As for the map that is within the field of view of the user interface, that also is rendered as a dynamic map, but also is an interactive map as the user is able to interact with that map when visible within the user interface. The initialization module 310 also may determine how to visually display the overall stack of maps corresponding to the map data for displaying multiple dynamic maps. For example, it can provide to display the stack of maps as being collapsed at the edge of a user interface on the user interface within the screen of the client device 170. Examples of a user interface will be described in detail with reference to one or more of FIGS. 8-11.

In addition to a dynamic map, the initialization module 310 also generates map data for rendering an interactive map to the user. The interactive map includes live data that a user can interact with on the user device. For example, the interactive map can update as the user moves. The interactive map is interactive in that it can be manipulated, e.g., panned, zoom in, and zoom out, by a user. The interactive map can also show the current location of the user. In one embodiment, the interactive map can be rendered based on selection of previously stored locations, such as home, a work place, a shop, a grocery store, etc. The initialization module 310 may determine the map data for displaying the interactive map as the top most one in the stack (e.g., a stack is similar to a stack of cards) of maps. In other words, the interactive map is displayed on top of any dynamic maps in the stack so that the user can interact with the interactive map conveniently. Accordingly, the location described by the interactive map may be referred to as the "location in focus," which in one example embodiment can be centered within a user interface.

In one embodiment, the initialization module 310 determines the map data for rendering an interactive map about a location and dynamic maps about other locations based on a preset rule. For example, the rule can be automatically determined based on GPS location or system rules or configuration (e.g., location name and pin points data predetermined relative to map) and/or (b) manually determined by the user (e.g., only show certain data such as all gas stations around point of interest) and/or a third party that may offer predefined "points of interests" to load into the app (e.g., corresponding to advertisement offerings for a place of business within the map area). For example, based on the predefined (or preset) rule, the initialization module 310 determines the current location of the user as the location in focus and generates map data for rendering an interactive map about the current location, while rendering multiple dynamic maps about other locations (e.g., the user's favorite locations other than the current location). Alternatively, a preset rule may specify the home of the user is always the location in focus. Accordingly, the initialization module 310 generates map data for rendering an interactive map about the home of the user, while rendering multiple dynamic maps about other identified, predefined, or selected locations as defined by the user and potentially stored by the user.

The map data generated by the initialization module 310 can be referred to as "map data at setup stage." In one embodiment, the initialization module 310 stores the map data at setup stage in the database 130 for rendering maps to the user upon a user request.

The interaction module 320 retrieves the map data and sends the map data to the client device 170. This information, provided by the interaction module 320, provides the client device 170 information (e.g., data and/or program code) for rendering the stack of maps in the user interface. This information may be rendered responsive to detecting a request for maps from the user. For example, the user uses the client device 170 to request one or more maps through a map application or software stored on the client device 170. The interaction module 320 retrieves the map data responsive to the user's request and sends the map data to the client device 170. The client device 170 can then display the stack of maps to the user in the user interface.

In one embodiment, the interaction module 320 may update the retrieved map data to render an interactive map about a current location of the user when the user requests maps for display. In another embodiment, the interaction module 320 may send the map data for rendering an interactive map about the home of the user without any change to the map data if the interactive map is always determined to be about the home of the user based on the preset rule.

In addition, the interaction module 320 may also update the map data for rendering the interactive map responsive to detecting an update of the current location of the user. For example, if the interactive map corresponds with the current location of the user based on data from the client device, e.g., GPS coordinates, the interaction module 320 updates the map data to reflect the change of the current location on the interactive map.

Alternatively, by way of example, if the interactive map corresponds to home or any other favorite location selected by the user, as the user is driving or travelling to that destination, the current location of the user changes with time as data from the client device, e.g., GPS coordinates, are continually updated. Hence, the route path, the estimated time, and distance to that location may correspondingly change with time. Therefore, the interaction module 320 updates the map data to reflect the change of the route path, estimated time and distance, to that location on the interactive map.

Further, the interaction module 320 may update the map data for rendering the dynamic maps responsive to detecting an update of the current location of the user. Each dynamic map corresponds with a specific location. For example, each dynamic map may be about a previously stored favorite location of the user. In response to detecting a change of the current location of the user (e.g., when the user is driving), the interaction module 320 updates the map data to reflect changes of estimated time and distance, and/or the route to the favorite location on each dynamic map. For example, the interaction module 320 updates the map data to display the changed estimated time and distance to the favorite location on the each dynamic map based on the updated current location of the user.

As an example, assume that a user starts from home to do a shopping trip to three shops (e.g., shop A, shop B, and shop C) that the user usually goes to and has been selected as favorite locations. The user opens an application on the client device 170 for requesting maps about the shops. Accordingly, the interaction module 320 retrieves the map data for rendering an interactive map about the current location of the user (e.g., home), three dynamic maps about the shop A, shop B, and shop C, and possibly other dynamic maps about other locations selected by the user. As the user is driving to shop A, the interaction module 320 detects (or receives) the updated coordinates of current location via a sensor, e.g., GPS, equipped with the client device 170. The interaction module 320 updates map data for the interactive map about the home, the dynamic maps for the shop A, shop B and shop C by calculating new estimated time and distance relative to a current location and/or between locations, and/or route to the location described by each of the maps.

In one embodiment, the interaction module 320 updates the stack of maps by removing map information (e.g., program code for rendering a map and corresponding data within it) about a location or adding a new map information corresponding to a new location based on the user de-selecting or removing a location and selecting a new location, respectively. For example, responsive to the user selecting a new location as a favorite location, the interaction module 320 generates map data for rendering a new map about the new favorite location in the stack of maps. Additionally, responsive to the user de-selecting one of the favorite locations (e.g., the user tapping a "star" button on one of the dynamic maps about a favorite location to an "unselected" state), the interaction module 320 updates the map data for removing the dynamic map about the deselected favorite location from the stack of maps.

Further, in one embodiment, the interaction module 320 updates the map information for rendering more details within the dynamic maps. For example, the user can interact with the dynamic map by swiping on a visible portion of the dynamic map within the user interface. In response to detecting the user swiping on the dynamic map, the client device 170 transmits this instruction to the interaction module 320, which updates the map information to provide for the display of more function buttons for the user, such as a favorite "star" button, a "to here" button and a "from here" button, which can be further interacted with by the user. This will be described in detail with reference to FIG. 11.

The transition module 330 updates the map data to replace one of the collapsed dynamic maps with an interactive map corresponding to the dynamic map that has been selected or previously identified by the user. For example, assume the dynamic map describes a favorite location "A" selected by the user. As defined above, the dynamic map may be only a screen captured map about the location "A" and cannot be interacted with by the user. An interactive map corresponding to the dynamic map includes live map data related to the location "A" that can be interacted with by the user. For example, the user can tap a "from here" button of the interactive map to request direction and/or a route from the location "A" to the current location. Alternatively, the user can tap a "to here" button of the interactive map to request direction and/or a route from the current location to the location "A". In one embodiment, the interactive map is rendered as zoomed and panned programmatically to the point, which makes it look exactly the same as the corresponding screen captured map. In addition, the replaced dynamic map can be faded away.

As described above, the interactive map is rendered by the client device 170 on the top of the stack of maps within the user interface. In one embodiment, responsive to the user scrolling the stack of maps such that one of the dynamic maps expands and takes the top spot of the stack, the transition module 330 updates the map data for replacing the present interactive map in the top spot with an new current interactive map corresponding to the dynamic map. The replaced interactive map can be removed visually from the user interface, e.g., deleted or dropped under the new interactive map.

By way of example, assume an interactive map about location "A" is rendered on the top most of the stack of maps. The user scrolls the stack of maps to make a dynamic map about location "B" take the top spot. Correspondingly, the transition module 330 determines map data for rendering an interactive map about the location "B" corresponding to the dynamic map about the location "B". For example, the transition module 330 determines the map data for displaying the interactive map about the location "B" on the top most of the stack replacing the position of the previously displayed interactive map about the location "A." In addition, the transition module 330 may determine the map data to remove the corresponding dynamic map from the set of collapsed dynamic maps. In this way, any map in the top spot of the stack is an interactive map that can be interacted with by the user. This beneficially allows the user to conveniently select a map from the stack and interact with the selected map.

Alternatively, responsive to receiving updated GPS coordinates that correspond with the current location of the client device 170 and that are displayed within the interactive map the transition module may determine that those coordinates match those of one of the dynamic maps. The transition module 330 updates the map information to provide for rendering a new interactive map corresponding to the one dynamic map at the top most of the stack. In the example of the user taking a shopping trip to the three shops A, B, and C, assume that the currently displayed interactive map is about the home of the user. When the user reaches shop A, the GPS coordinates of the currently displayed interactive map matches those of the dynamic map of the shop A, and the transition module 330 updates the map data for displaying an interactive map about the shop A corresponding to the dynamic map of the shop A on the top most of the stack. In one embodiment, the transition module 330 also updates the map data to replace the previously displayed interactive map (e.g., the interactive map about the home) with a corresponding dynamic map (e.g., a dynamic map about the home) and renders the dynamic map in a position of the stack of maps (e.g., at the bottom of the stack).

Further, in another embodiment, the system can be configured to include instructions that help keep use of computing resources efficient. For example, if the transition module 330 receives information from the client device 170 that the map information within a current interactive map matches one of the dynamic maps, there may be instructions provided that notes that the current interactive map matches one of the collapsed dynamic maps. In this case, there may be no need to provide a rendering to replace the interactive map corresponding to the one dynamic map, although the instructions may allow updating select information that is not in the current interactive map with any additional data found (or not found) in the matching dynamic map. Hence, the amount of data needed to be transferred is limited thereby saving network bandwidth and power on the client device 170.

In one embodiment, the transition module 330 updates the map data for replacing a view of the stack of maps (may also be referred to as a "stack view") with a full screen map view (may also be referred to as a "full screen view"). For example, the user may interact with the user interface showing the stack of maps by tapping an arrow button to shift to a full screen view. This will be described with reference to FIG. 10. Responsive to detecting the user tapping on the button, the transition module 330 updates the map data for rendering (e.g., displaying) the current interactive map in a full screen view in the user interface so that the user can more easily interact with the map. Additionally, when detecting the user tapping a button to shift back to the stack view, the transition module 330 updates the map data for displaying the stack of maps that includes the interactive map displayed on the top as well as a set of collapsed dynamic maps displayed at the edge of the user interface.

Example Processes

Figure 4:
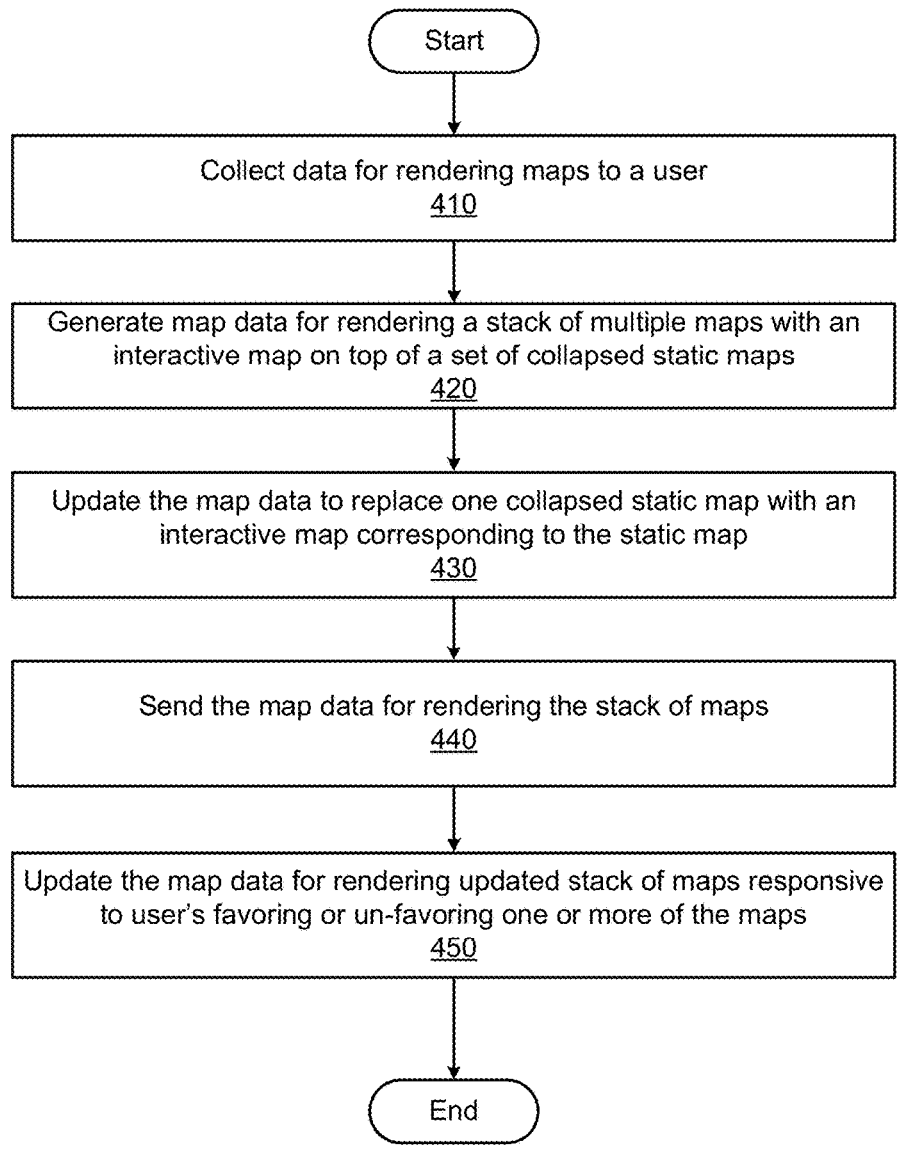
FIG. 4 is a flowchart illustrating an example method for rendering a stack of maps for a user according to one embodiment.

FIG. 4 is a flowchart illustrating an example method 400 for rendering a stack of maps according to one embodiment. In one embodiment, FIG. 4 attributes the steps of the method 400 to the map module 115 of the server 110. However, some or all of the steps may be performed by other entities such as the client devices 170. In addition, some embodiments may perform the steps in parallel, perform the steps in different orders, or perform different steps. Also, it is noted that in one example embodiment the steps and/or modules may be embodied as instructions, e.g., instructions 224, that may be executed by the processor 202 described with respect to FIG. 2.

Initially, the map module 115 collects 410 user data for rendering maps to a user. As described previously with regard to FIG. 3, the user data may describe a destination input by the user, a current location of the user detected by a sensor equipped with the client device 170, and/or a favorite location selected by the user.

At step 420, the map module 115 generates map data for rendering a stack of multiple maps, for example, with an interactive map on top of a set of collapsed dynamic maps. This step 420 will be described in detail with reference to FIG. 5.

At step 430, the map module 115 updates the map data to replace one collapsed dynamic map with an interactive map corresponding to the dynamic map. Two embodiments for this step 430 will be described in detail with reference to FIGS. 6-7. At step 440, the map module 115 sends the map data for rendering the stack of maps, for example, to the client device 170 of the user.

At step 450, the map module 115 updates the map data for rendering an updated stack of maps, for example, responsive to the user favoring or un-favoring one or more of the maps in the stack. For example, responsive to the user selecting a new location as a favorite location, the map module 115 updates the map data for adding a new dynamic map about the new location into the stack of maps. Additionally, responsive to the user unselecting a favorite location, the map module 115 updates the map data for removing the dynamic map about the unselected favorite location from the stack of maps.

Figure 5:
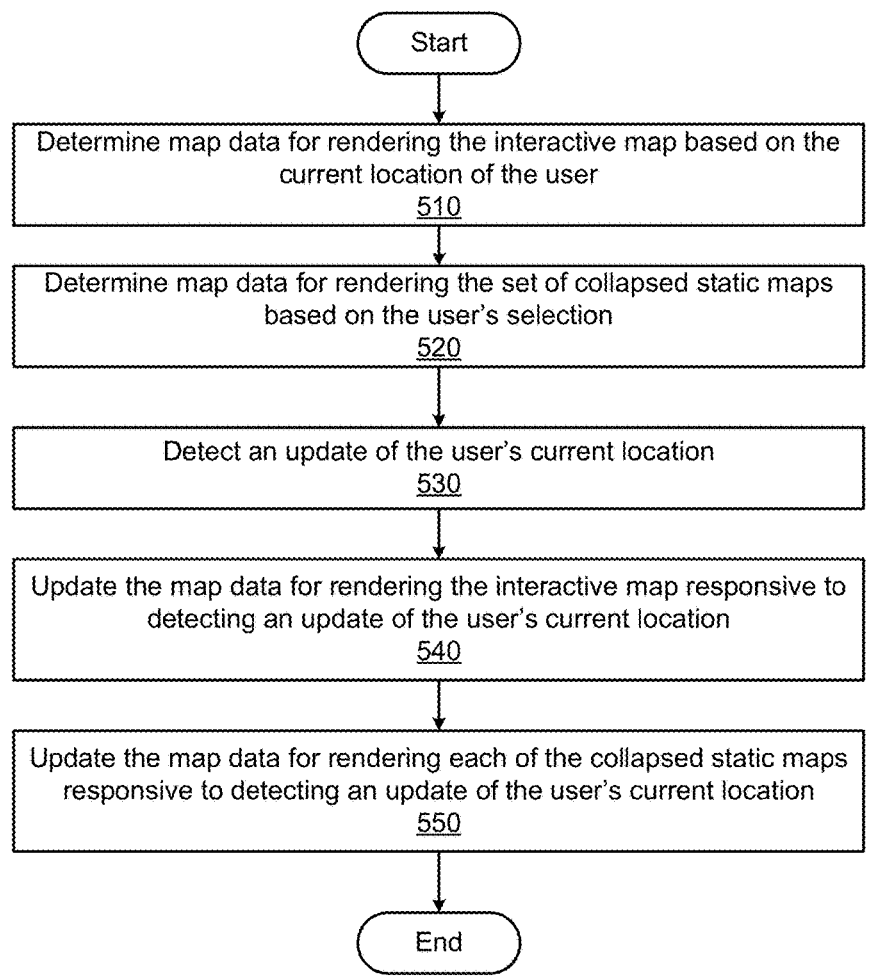
FIG. 5 is a flowchart illustrating an example method for generating map data for rendering a stack of maps with an interactive map on top of a set of collapsed dynamic maps according to one embodiment.

FIG. 5 is a flowchart illustrating an example method 500 describing the step 420 of the method 400 in detail for generating map data for rendering a stack of maps with an interactive map on top of a set of collapsed dynamic maps according to one embodiment. In one embodiment, FIG. 5 attributes the steps of the method 500 to parts of the sub-modules in the map module 115 of the server 110 or the client device 170. However, some or all of the steps may be performed by other entities. In addition, some embodiments may perform the steps in parallel, perform the steps in different orders, or perform different steps. Also, it is noted that in one example embodiment the steps and/or modules may be embodied as instructions, e.g., instructions 224, that may be executed by the processor 202 as described with respect to FIG. 2.

Initially, the map module 115 determines 510 map data for rendering the interactive map based on the current location of the user. For example, the interactive map includes live data that can be interacted with by the user. The map module 115 may determine the map data to display an interactive map about the current location of the user. The interactive map may also include other information.

At step 520, the map module 115 determines map data for rendering the set of collapsed dynamic maps based on the user's selection. For example, the user has selected favorite locations. The map module 115 determines map data for a set of dynamic maps describing the selected favorite locations. The set of dynamic maps may be displayed as collapsed at the edge of the user interface on the screen of the client device 170. In one embodiment, each dynamic map may also include an estimated time and distance from the current location of the user to the favorite location described by the dynamic map.

At step 530, the map module 115 detects an update of the user's current location. For example, the map module 115 receives sensor data describing the user's current geographical location from a sensor equipped with the client device 170 and detects whether the current location has changed since last sensing time.

At step 540, the map module 115 updates the map data for rendering the interactive map responsive to detecting an update of the user's current location. For example, the map module 115 may update map data for displaying another interactive map describing the updated current location of the user.

At step 550, the map module 115 updates the map data for rendering each of the collapsed dynamic maps responsive to detecting an update of the user's current location. For example, the map module 115 may update the estimated time and distance from the updated current location of the user to the favorite location described by each of the dynamic maps.

Figure 6:
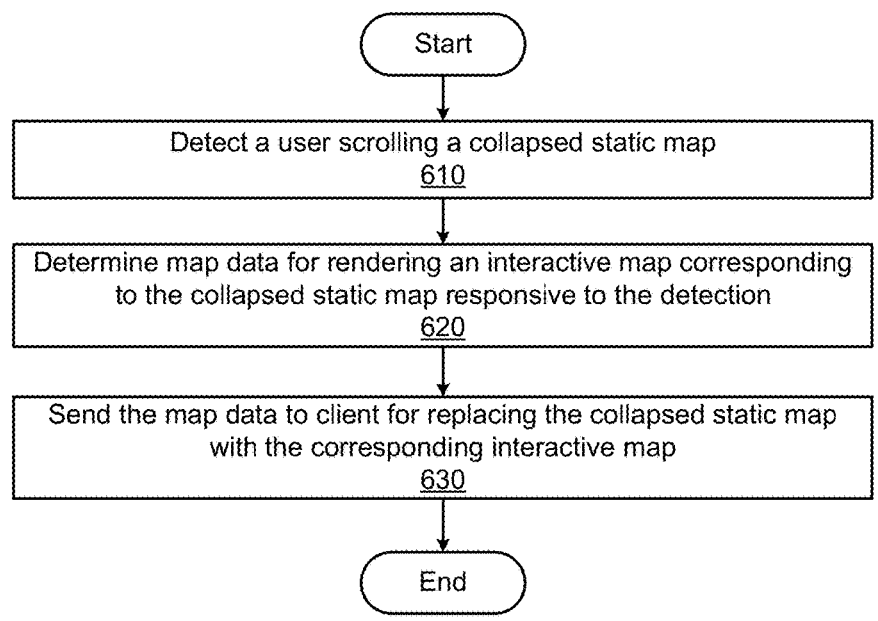
FIG. 6 is a flowchart illustrating an example method for updating map data to replace one of a collapsed dynamic map with an interactive map according to one embodiment.
Figure 7:
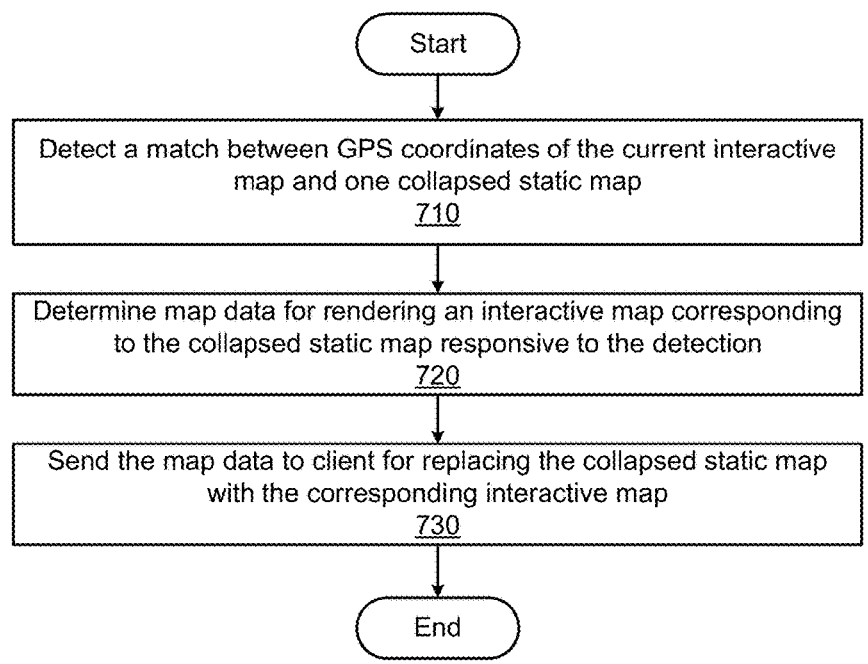
FIG. 7 is a flowchart illustrating another example method for updating map data to replace one of a collapsed dynamic map with an interactive map according to one embodiment.

Referring now to FIGS. 6 and 7, illustrated are flowcharts of two exemplary methods 600 and 700 that describe the step 430 of the method 400 for updating map data to replace one of a collapsed dynamic map with an interactive map according to one embodiment. FIGS. 6 and 7 attribute the steps of the methods 600 and 700 to parts of the sub-modules in the map module 115 of the server 110 or the client device 170. However, some or all of the steps may be performed by other entities. In addition, some embodiments may perform the steps in parallel, perform the steps in different orders, or perform different steps. Also, it is noted that in one example embodiment the steps and/or modules may be embodied as instructions, e.g., instructions 224, that may be executed by the processor 202 described with respect to FIG. 2.

Referring to FIG. 6, the map module 115 detects 610 a user scrolling a collapsed dynamic map. For example, the map module 115 detects (or receives information corresponding to an action from the client device 170) that the user scrolls one of the collapsed dynamic maps (e.g., a dynamic map about location "X") such that the collapsed dynamic map (e.g., the dynamic map about location "X") expands and takes the top spot of the stack of maps. The map module 115 determines 620 the map data for rendering an interactive map corresponding to the collapsed dynamic map responsive to the detection. For example, the map module 115 determines the map data for rendering an interactive map about the location "X" corresponding to the dynamic map about the location "X". At step 630, the map module 115 sends the map data to client for replacing the collapsed dynamic map with the corresponding interactive map. For example, the corresponding interactive map about the location "X" is displayed at the top spot of the stack of maps and the dynamic map about the location "X" is faded away.

Referring now to FIG. 7, another example method 700 for the step 430 of updating map data to replace one of a collapsed dynamic map with an interactive map is illustrated in detail. The step 430 initiates the map module 115 by detecting 710 a match between GPS coordinates of the current interactive map and one collapsed dynamic map. For example, one collapsed dynamic map is about location "A". When the user reaches the location "A", the current interactive map may match the collapsed dynamic map in GPS coordinates.

At step 720, the map module 115 determines map data for rendering an interactive map corresponding to the collapsed dynamic map responsive to the detection. At step 730, the map module 340 sends the map data to client for replacing the collapsed dynamic map with the corresponding interactive map.

Example User Interfaces

Referring now to FIGS. 8-11, illustrated are example graphical representations for user interfaces displaying different aspects of a stack of maps. For example, the graphical user interfaces (GUIs) are generated by the visualization module 177 of the client device 170. It is noted that generation of the user interfaces is through program code that is stored in a storage device, e.g., storage unit 216 or main memory 204, and executable by a processor, e.g., processor 202, of a client device 170. The instructions may be generated by the server 110 or the client device 170 depending on where the particular modules described herein corresponding to the particular functions (and corresponding instructions) are executing. In some embodiments, a user may interact with the GUIs using a touchscreen input by "tapping" on UI elements within the GUIs. In other embodiments, the user may interact with the GUIs using other methods, such as via a pointing device (e.g., a computer mouse).

Figure 8:
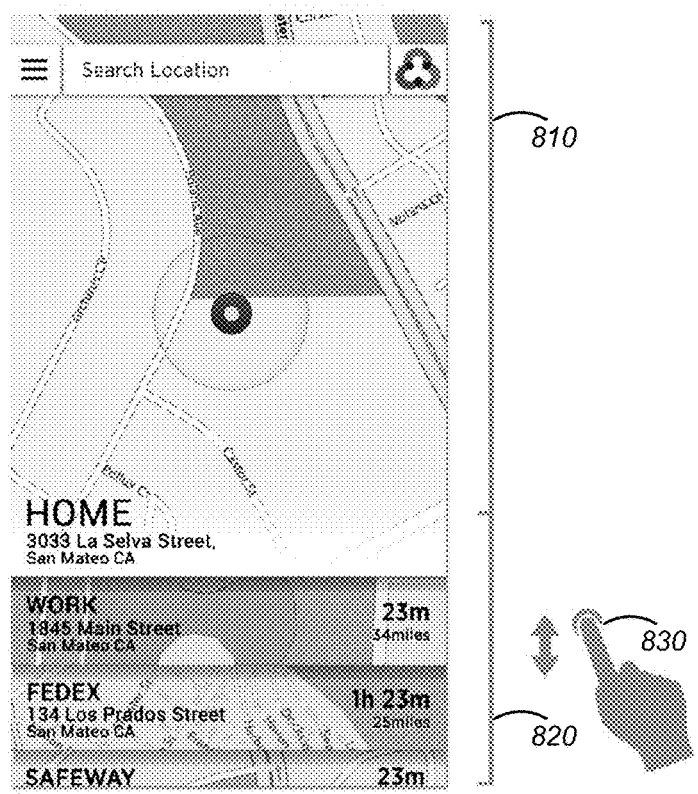
FIGS. 8-11 are example graphical representations for user interfaces displaying different aspects of a stack of maps.

FIG. 8 illustrates a GUI 800 showing a stack of maps. In the illustrated embodiment, the GUI 800 includes an interactive map 810 that has live data. In FIGS. 8-11, interactions with the user interface by an example user are also illustrated as 830. For example, the interactive map 810 is about the current location of the client device 170. The interactive map 810 is displayed on the top most of the stack of maps and can be interacted with by the user of the client device 170. For example, the map module 115 determines map data and transmits the map information to the client device 170 for displaying the interactive map 810 on the top most of the stack of maps.

The GUI 800 also includes a set of collapsed dynamic maps 820 (as also indicated by labels "Work", "Fedex" and "Safeway" in the exemplary GUI 800). Each of the set of collapsed dynamic maps 820 may be a screen shot (e.g., determined by the map module 115) describing a favorite location selected by the user. Each of the set of collapsed dynamic maps 820 may also include an estimated time and distance from the current location of the user and the predefined location described through the dynamic map. The set of collapsed dynamic maps 820 is displayed at the edge (e.g. bottom edge) of the GUI 800 and can be scrolled by the user.

Figure 9:
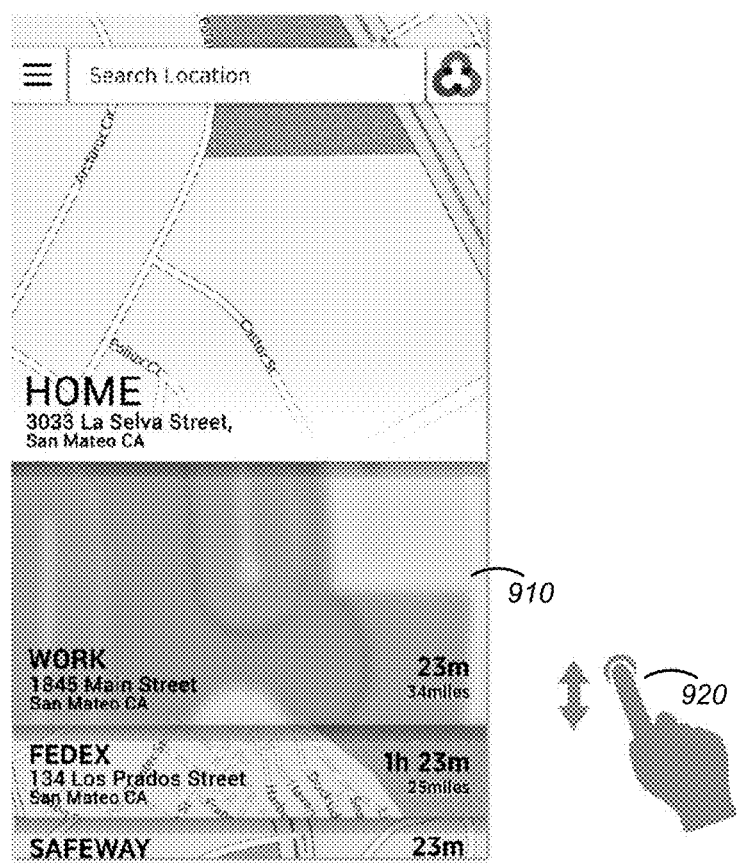

FIG. 9 illustrates a GUI 900 showing a transition of a dynamic map to an interactive map that corresponds to the dynamic map. The GUI 900 includes a dynamic map 910 originally collapsed at the edge of the GUI 900. As illustrated in FIG. 9, a user scrolls (illustrated by user interaction 920 relative to displayed maps) the dynamic map 910 so that the dynamic map 910 expands and can take the top spot of the stack of maps in the GUI 900. In one embodiment, responsive to the dynamic map 910 taking the top spot of the stack, the map module 115 updates the map data for replacing the dynamic map 910 (e.g., the screen shot) with an interactive map that corresponds to the dynamic map 910. The new interactive map can be displayed on the top most of the stack and can be interacted with by the user.

Figure 10:
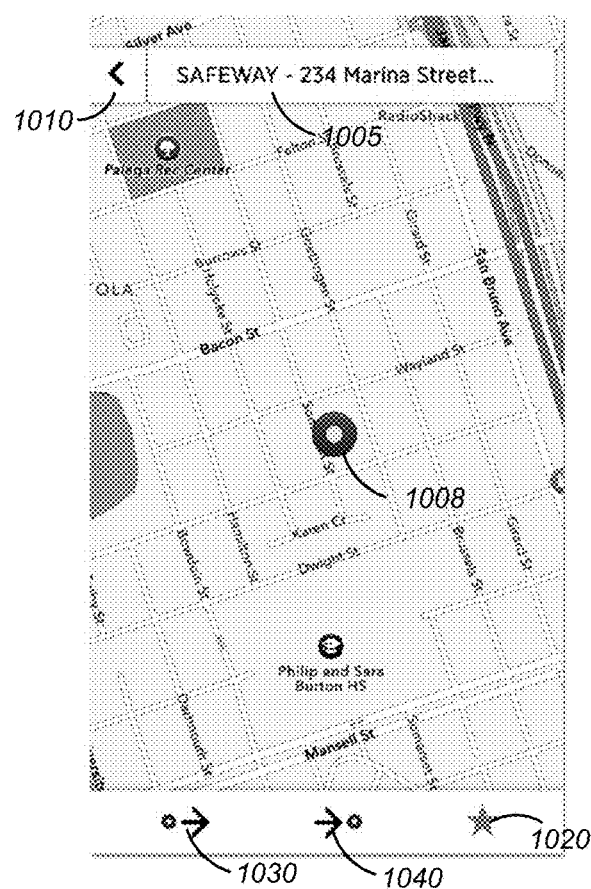

FIG. 10 illustrates a GUI 1000 showing an interactive map in a full screen view. The full screen view may be activated on a device when a user performs a specific interaction with the interactive map on the non-full screen view. For example, the user may double tap on the interactive map using a touchscreen interface. The GUI 1000 includes a shift button 1010 that can be tapped by the user to change back to a stack view showing the stack of maps such as those shown in GUIs 800 and 900. For example, responsive to the user tapping on the shift button 1010, the map module 115 updates the map data to shift between different views of the maps. The GUI 1000 includes an address box 1005 having a selected location automatically input. The selected location is the location described by the interactive map. The GUI 1000 also includes, in the interactive map, an indicator 1008 that shows the selected location.

In addition, the GUI 1000 includes a "star" button 1020 that can be tapped by the user to select or unselect the location described by the interactive map as a favorite location. As illustrated in FIG. 10, the GUI 1000 also includes a "from here" button 1030 and a "to here" button 1040 that can be tapped by the user to request direction or route information about a trip from the selected location to the current location of the user and a trip from the current location to the selected location, respectively. For example, responsive to the user tapping the "from here" button 1030, the map module 115 updates the map data for displaying a route from the selected location to the current location of the user on the interactive map.

Figure 11:
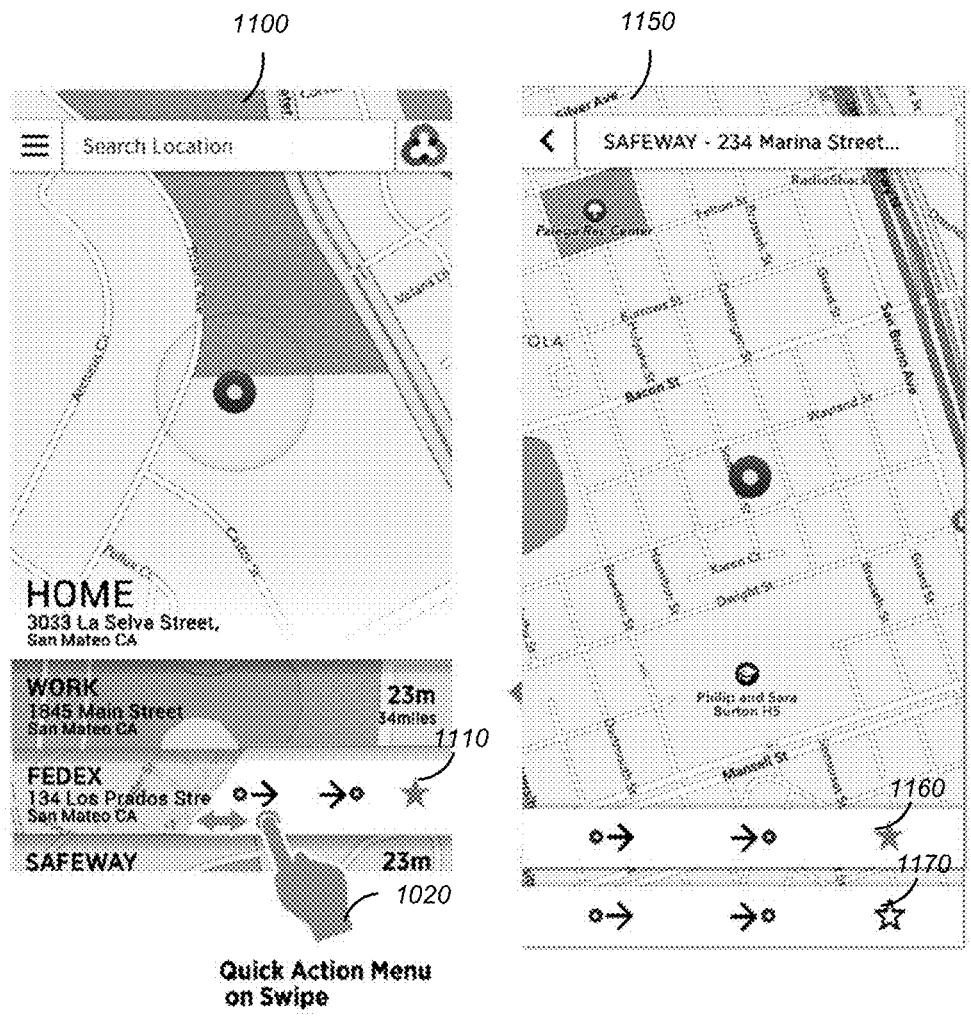

FIG. 11 illustrates GUIs 1100 and 1150 showing the adding or removing of a favorite location under two different views, respectively. The GUI 1100 shows a way to remove a favorite location in the stack view. The GUI 1100 includes multiple dynamic maps collapsed at the edge of the GUI 1100. Each dynamic map can be swiped 1020 by the user to show one or more interactive buttons including a "star" button 1110, a "to here" button, and a "from here" button that are the same as those in the GUI 1000. The "star" button 1110 can be tapped by the user to remove the location described by the dynamic map from favorite locations. Accordingly, responsive to the user tapping the "star" button 1110 to unselect the location described by the dynamic map, the map module 115 updates the map data for removing the dynamic map about the unselected location from display.

The GUI 1150 shows a way to add or remove a favorite location in a full screen view. Similar to the GUI 1000, the GUI 1150 includes a "star" button. The "star" button has two states 1160 and 1170 indicating the location described by the GUI 1150 is selected and unselected as a favorite location, respectively. Therefore, the user can tap the "star" button to change the state of the button to select and unselect the location as a favorite location. Responsive to the user's selection, the map module 115 can update the map data for adding or removing the corresponding map describing the location from the stack of maps.

Additional Configuration Considerations

Accordingly, as described above, the system and method for rendering stack of map user interfaces that provide numerous advantages over the traditional model. For example, the system can provide a user a quick shortcut of a map to the user's favorite locations that the user can immediately interact with. In addition, the system can suggest the user the best possible routes to a particular location upon a single action, e.g., tap or swipe, by a user on a client device. Thereafter, other maps corresponding to other locations of interest can be "stacked" below the interaction map and, when brought to the top of the stack, can be the new interaction map.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, e.g., as shown and described with FIGS. 1 and 3, and further described with FIGS. 4-11. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., processor 202) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software (or program code) to perform certain operations. It will be appreciated that the decision to implement a hardware module mechanically, in dedicated and permanently configured circuitry, or in temporarily configured circuitry (e.g., configured by software or program code) may be driven by cost and time considerations.

The various operations of example methods described herein may be performed, at least partially, by one or more processors, e.g., processor 202, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors 202), these operations being accessible via a network (e.g., the Internet) and via one or more appropriate interfaces (e.g., application program interfaces (APIs).)

The performance of certain of the operations may be distributed among the one or more processors, e.g., processor 202, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process to provide for and/or render of stack of maps in a user interface. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for rendering maps for a user, the method comprising:
    collecting user data for rendering a plurality of maps to a user, the user data describing at least one destination;
    generating, based on the user data, map data for rendering a plurality of maps arranged in a stack, the plurality of maps including a first interactive map and one or more dynamic maps, the first interactive map displayed on top of the one or more dynamic maps, and each of the plurality of maps rendered with a portion that is selectable;
    updating the map data to replace the first interactive map with a second interactive map in response to selection of one of the one or more dynamic maps via the portion that is selectable, the selected dynamic map becoming the second interactive map; and
    transmitting the map data for rendering a second plurality of maps arranged in a stack, the second interactive map displayed on top to replace the first interactive map.

2. The method of claim 1, wherein the one or more dynamic map are displayed as collapsed at an edge of a screen of a user interface.

3. The method of claim 1, wherein the user data further describes one or more locations favored by the user.

4. The method of claim 1, further comprising:
    responsive to the user favoring a new location that has not been described by the plurality of maps, adding a new map describing the new location to the plurality of maps.

5. The method of claim 1, further comprising:
    responsive to the user un-favoring a location that has been described by the plurality of maps, removing the map describing the location from the plurality of maps.

6. The method of claim 1, wherein the user data further describes a current location of the user.

7. The method of claim 1, wherein the generating the map data for rendering the stack of multiple maps comprises:
    determining the map data for rendering the interactive map based on the current location of the user.

8. The method of claim 1, wherein the generating the map data for rendering the plurality of maps arranged in a stack comprises:
    detecting an update of the current location of the user; and
    updating the map data for rendering the interactive map responsive to detecting the update of the current location of the user.

9. The method of claim 1, wherein the generating the map data for rendering the plurality of maps arranged in a stack comprises:
    detecting an update of the current location of the user; and
    updating the map data for rendering each of the dynamic maps responsive to detecting the update of the current location of the user.

10. The method of claim 1, wherein the updating the map data to replace the first interactive map with a second interactive map in response to selection of one of the one or more dynamic maps comprises:
    detecting the user scrolling the one of the one or more dynamic maps; and
    responsive to detecting the user scrolling through one of the one or more dynamic maps, determining updated map data for rendering the second interactive map corresponding to the scrolled dynamic map.

11. The method of claim 1, wherein the updating the map data to replace the first interactive map with a second interactive map in response to selection of one of the one or more dynamic maps comprises:
    detecting a match between coordinates of the first interactive map and the one of the one or more dynamic maps; and
    responsive to detecting the match between coordinates of the first interactive map and the one of the one or more dynamic maps, determining updated map data for rendering the second interactive map corresponding to the matched dynamic map.

12. A system comprising:
    a processor; and
    a non-transitory computer readable storage medium storing instructions thereon, that when executed by the processor, causes the processor to perform operations comprising:
    collecting user data for rendering a plurality of maps to a user, the user data describing at least one destination;
    generating, based on the user data, map data for rendering a plurality of maps arranged in a stack, the plurality of maps including a first interactive map and one or more dynamic maps, the first interactive map displayed on top of the one or more dynamic maps, and each of the plurality of maps rendered with a portion that is selectable;
    updating the map data to replace the first interactive map with a second interactive map in response to selection of one of the one or more dynamic maps via the portion that is selectable, the selected dynamic map becoming the second interactive map; and
    transmitting the map data for rendering a second plurality of maps arranged in a stack, the second interactive map displayed on top to replace the first interactive map.

13. The system of claim 12, the storage medium storing further instructions, that when executed by the processor, causes the processor to perform operations comprising:
    responsive to the user favoring a new location that has not been described by the plurality of maps, adding a new map describing the new location to the plurality of maps.

14. The system of claim 12, the storage medium storing further instructions for the generating the map data for rendering the plurality of maps arranged in a stack, that when executed by the processor, causes the processor to perform operations comprising:
    detecting an update of the current location of the user; and
    updating the map data for rendering each of the dynamic maps responsive to detecting the update of the current location of the user.

15. The system of claim 12, the storage medium storing further instructions for the updating the map data to replace the first interactive map with a second interactive map in response to selection of one of the one or more dynamic maps, that when executed by the processor, causes the processor to perform operations comprising:

detecting a match between coordinates of the first interactive map and the one of the one or more dynamic maps; and responsive to detecting the match between coordinates of the first interactive map and the one of the one or more dynamic maps, determining updated map data for rendering the second interactive map corresponding to the matched dynamic map.

16. A non-transitory computer readable storage medium storing instructions thereon, that when executed by at least one processor causes the processor to:

collect user data for rendering a plurality of maps to a user, the user data to describe at least one destination;

generate, based on the user data, map data to render a plurality of maps arranged in a stack, the plurality of maps including a first interactive map and one or more dynamic maps, the first interactive map to be displayed on top of the one or more dynamic maps, and each of the plurality of maps rendered with a portion that is selectable;

update the map data to replace the first interactive map with a second interactive map in response to selection of one of the one or more dynamic maps via the portion that is selectable, the selected dynamic map to become the second interactive map; and transmit the map data to render a second plurality of maps arranged in a stack, the second interactive map to be displayed on top to replace the first interactive map.

17. The non-transitory computer readable storage medium of claim 16, wherein the one or more dynamic map are displayed as collapsed at an edge of a screen of a user interface.

18. The non-transitory computer readable storage medium of claim 16, wherein the user data further describes one or more locations favored by the user.

19. The non-transitory computer readable storage medium of claim 16, further comprising instructions that when executed by the processor causes the processor to:

add, responsive to the user favoring a new location that has not been described by the plurality of maps, a new map describing the new location to the plurality of maps.

20. The non-transitory computer readable storage medium of claim 16, further comprising instructions that when executed by the processor causes the processor to:

remove, responsive to the user un-favoring a location that has been described by the plurality of maps, the map describing the location from the plurality of maps.

21. The non-transitory computer readable storage medium of claim 16, wherein the user data further describes a current location of the user.

22. The non-transitory computer readable storage medium of claim 16, wherein instructions to generate the map data to render the stack of multiple maps further comprises instructions that when executed by the processor causes the processor to:

determine the map data for rendering the interactive map based on the current location of the user.

23. The non-transitory computer readable storage medium of claim 16, wherein the instructions to generate the map data to render the plurality of maps arranged in a stack further comprises instructions that when executed by the processor causes the processor to:

detect an update of the current location of the user; and update the map data to render the interactive map responsive to the detection of the update of the current location of the user.

24. The non-transitory computer readable storage medium of claim 16, wherein the instructions to generate the map data to render the plurality of maps arranged in a stack further comprise instructions that when executed by the processor causes the processor to:

detect an update of the current location of the user; and update the map data to render each of the dynamic maps responsive to the detection of the update of the current location of the user.

25. The non-transitory computer readable storage medium of claim 16, wherein the instructions to update the map data to replace the first interactive map with a second interactive map in response to selection of one of the one or more dynamic maps further comprises instructions that when executed by the processor causes the processor to:

detect the user scrolling the one of the one or more dynamic maps; and determine, responsive to the detection of the user scrolling through one of the one or more dynamic maps, updated map data to render the second interactive map corresponding to the scrolled dynamic map.

26. The non-transitory computer readable storage medium of claim 16, wherein the instructions to update the map data to replace the first interactive map with a second interactive map in response to selection of one of the one or more dynamic maps further comprises instructions that when executed by the processor causes the processor to:

detect a match between coordinates of the first interactive map and the one of the one or more dynamic maps; and determine, responsive to the detection of the match between coordinates of the first interactive map and the one of the one or more dynamic maps, updated map data to render the second interactive map corresponding to the matched dynamic map.

* * * * *